(12) United States Patent
Kim et al.

(10) Patent No.: US 10,530,708 B2
(45) Date of Patent: Jan. 7, 2020

(54) APPARATUS AND METHOD FOR MANAGING COMPUTING RESOURCES IN NETWORK FUNCTION VIRTUALIZATION SYSTEM

(71) Applicant: SAMSUNG SDS CO., LTD., Seoul (KR)

(72) Inventors: Sun-Deuk Kim, Seoul (KR); Hyun-Taek Oh, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 236 days.

(21) Appl. No.: 15/490,199

(22) Filed: Apr. 18, 2017

(65) Prior Publication Data

US 2017/0310609 A1    Oct. 26, 2017

(30) Foreign Application Priority Data

Apr. 21, 2016    (KR) .................... 10-2016-0048664

(51) Int. Cl.
*G06F 15/173* (2006.01)
*H04L 12/911* (2013.01)
*H04L 12/24* (2006.01)

(52) U.S. Cl.
CPC ............ *H04L 47/822* (2013.01); *H04L 41/06* (2013.01); *H04L 41/14* (2013.01)

(58) Field of Classification Search
CPC ........ H04L 47/822; H04L 41/06; H04L 41/14
See application file for complete search history.

(56) References Cited

U.S. PATENT DOCUMENTS

| | | | |
|---|---|---|---|
| 2008/0243607 A1* | 10/2008 | Rohan .................... | G06Q 30/02 705/14.69 |
| 2013/0318534 A1* | 11/2013 | Arapov ................. | G06F 9/5088 718/104 |
| 2014/0137110 A1* | 5/2014 | Engle .................... | G06F 9/5022 718/1 |
| 2015/0180730 A1* | 6/2015 | Felstaine ............... | H04L 41/022 709/225 |
| 2015/0254203 A1* | 9/2015 | Higuchi ................ | G06F 9/5011 710/314 |
| 2015/0358829 A1* | 12/2015 | Arnott ................... | H04W 72/06 455/454 |
| 2017/0142206 A1* | 5/2017 | Kodaypak ........... | H04L 12/1407 |
| 2018/0013656 A1* | 1/2018 | Chen ..................... | H04W 24/04 |
| 2018/0060136 A1* | 3/2018 | Herdrich ............... | G06F 9/5077 |
| 2018/0262410 A1* | 9/2018 | Chou .................... | G06F 9/45558 |
| 2018/0307539 A1* | 10/2018 | Celozzi ................. | G06F 9/5077 |

* cited by examiner

*Primary Examiner* — Jonathan A Bui
(74) *Attorney, Agent, or Firm* — Sughrue Mion, PLLC

(57) ABSTRACT

A computing resource management apparatus and method are provided. The computing resource management apparatus comprise, at least one processor configured to implement: a collector configured to collect an amount of computing resources used by each of a plurality of virtual network functions (VNFs) which are connected by service chaining; a detector configured to detect, from among the plurality of VNFs, a target VNF to be adjusted by respectively comparing computing resources used by each of the plurality of VNFs with computing resources allocated to each of the plurality of VNFs; and an adjustor configured to adjust computing resources allocated to the target VNF, and adjust computing resources allocated to a plurality of remaining VNFs, from among the plurality of VNFs, based on an adjusted amount of computing resources.

15 Claims, 5 Drawing Sheets

APPARATUS AND METHOD FOR MANAGING COMPUTING RESOURCES IN NETWORK FUNCTION VIRTUALIZATION SYSTEM

CROSS-REFERENCE TO RELATED APPLICATION

This application claims priority to and the benefit of Korean Patent Application No. 2016-0048664, filed on Apr. 21, 2016, the disclosure of which is incorporated herein by reference in its entirety.

BACKGROUND

1. Field

Exemplary embodiments of the present disclosure relate to a technology for managing computing resources.

2. Discussion of Related Art

Network function virtualization (NFV) technology has been introduced as a technology for easily accommodating network traffic generated according to an increase in network usage. NFV is a technology in which common carriers are able to efficiently manage a network infrastructure by separately operating a software-based network function from hardware. NFV installs a conventional network function not in a hardware apparatus but in a server operating system (OS) and the like and utilizes it. According to NFV, it is possible to implement expandability and flexibility of a network since the hardware apparatus is able to be utilized in different OSs. In other words, NFV is able to perform each virtual network function (VNF) by receiving computing resources provided for each of the VNFs.

Meanwhile, when computing resources supporting a specific network function are lacking or excessively great in NFV, it is necessary to adjust the computing resources allocated for each of the network functions. However, conventionally, computing resources have been uniformly allocated to each network function without considering the amount of computing resources required for each of the network functions. Accordingly, wasted computing resources have been present even when the computing resources are re-allocated.

Therefore, a technology for efficiently allotting computing resources for each VNF is needed.

SUMMARY

The present disclosure has an objective of solving problems of the conventional art.

The present disclosure is directed to providing an apparatus and method for efficiently managing computing resources by compensating for insufficient computing resources and minimizing wasted computing resources in a network function virtualization system.

According to one aspect of the present disclosure, there is provided a computing resource management apparatus, comprising: at least one processor configured to implement: a collector configured to collect an amount of computing resources used by each of a plurality of virtual network functions (VNFs) which are connected by service chaining; a detector configured to detect, from among the plurality of VNFs, a target VNF to be adjusted by respectively comparing computing resources used by each of the plurality of VNFs with computing resources allocated to each of the plurality of VNFs; and an adjustor configured to adjust computing resources allocated to the target VNF, and adjust computing resources allocated to a plurality of remaining VNFs, from among the plurality of VNFs, based on an adjusted amount of computing resources.

The target VNF to be adjusted may have a ratio of computing resources used to computing resources allocated outside a predetermined threshold range.

The adjustor may be further configured to increase computing resources allocated to the target VNF when the ratio is greater than the threshold range, and decrease computing resources allocated to the target VNF when the ratio is less than the threshold range.

The adjustor may be further configured to adjust computing resources allocated to the plurality of remaining VNFs based on corresponding ratios of computing resources used and computer resources allocated.

The adjustor may be further configured to adjust computing resources allocated to the plurality of remaining VNFs so that a ratio of computing resources used by the target VNF and computing resources used by the plurality of remaining VNFs corresponds to a ratio of computing resources allocated to the target VNF and computing resources allocated to the plurality of remaining VNFs.

The at least one processor may be further configured to implement an alarm generator configured to generate an alarm message in response to computing resources allocated to the target VNF being greater than an amount of computing resources provided to the target VNF.

According to another aspect of the present disclosure, there is provided a computing resource management method performed by a computing device including one or more processors and a memory configured to store one or more programs executed by the one or more processors, the computing resource management method comprising: collecting an amount of computing resources used by each of a plurality of virtual network functions (VNFs) which are connected by service chaining; detecting, from among the plurality of VNFs, a target VNF to be adjusted by respectively comparing computing resources used by each of the plurality of VNFs with computing resources allocated to each of the plurality of VNFs; adjusting computing resources allocated to the target VNF; and adjusting computing resources allocated to a plurality of remaining VNFs, from among the plurality of VNFs, based on an adjusted amount of computing resources.

The target VNF to be adjusted may have a ratio of computing resources used to computing resources allocated outside a predetermined threshold range.

The adjusting computing resources allocated to the target VNF may comprise increasing computing resources allocated to the target VNF when the ratio is greater than the threshold range, and decreasing computing resources allocated to the target VNF when the ratio is less than the threshold range.

The adjusting computing resources allocated to the plurality of remaining VNFs may be based on corresponding ratios of computing resources used and computer resources allocated.

The adjusting computing resources allocated to the plurality of remaining VNFs may adjust the adjusting computing resources allocated to the plurality of remaining VNFs so that a ratio of computing resources used by the target VNF and computing resources used by the plurality of remaining VNFs corresponds to a ratio of computing resources allocated to the target VNF and computing resources allocated to the plurality of remaining VNFs.

The computing resource management method may further comprise, generating an alarm message in response to computing resources allocated to the target VNF being greater than an amount of computing resources provided to the target VNF.

According to another aspect of the present disclosure, there is provided a non-transitory computer readable recording medium having embodied thereon a program, which when executed by a processor of a computing resource management apparatus causes the computing resource management apparatus to execute a computing resource management method, the computing resource management method including: collecting an amount of computing resources used by each of a plurality of virtual network functions (VNFs) which are connected by service chaining; detecting, from among the plurality of VNFs, a target VNF to be adjusted by respectively comparing computing resources used by each of the plurality of VNFs with computing resources allocated to each of the plurality of VNFs; adjusting computing resources allocated to the target VNF; and adjusting computing resources allocated to a plurality of remaining VNFs, from among the plurality of VNFs, based on an adjusted amount of computing resources.

The target VNF to be adjusted may have a ratio of computing resources used to computing resources allocated outside a predetermined threshold range.

The adjusting computing resources allocated to the target VNF may comprise increasing computing resources allocated to the target VNF when the ratio is greater than the threshold range, and decreasing computing resources allocated to the target VNF when the ratio is less than the threshold range.

The adjusting computing resources allocated to the plurality of remaining VNFs may be based on corresponding ratios of computing resources used and computer resources allocated.

The adjusting computing resources allocated to the plurality of remaining VNFs may adjust the adjusting computing resources allocated to the plurality of remaining VNFs so that a ratio of computing resources used by the target VNF and computing resources used by the plurality of remaining VNFs corresponds to a ratio of computing resources allocated to the target VNF and computing resources allocated to the plurality of remaining VNFs.

The computing resource management method may further comprise, generating an alarm message in response to computing resources allocated to the target VNF being greater than an amount of computing resources provided to the target VNF.

DETAILED DESCRIPTION OF EXEMPLARY EMBODIMENTS

Hereinafter, embodiments of the present disclosure will be described with reference to the accompanying drawings. The following description is provided to facilitate a comprehensive understanding related to a method, an apparatus, and/or a system described herein. However, the description is merely an example, and the present disclosure is not limited thereto.

In a description of embodiments of the present disclosure, when it is determined that a detailed description related to a known technology related to the present disclosure would unnecessarily obscure the gist of the present disclosure, the detailed description thereof will be omitted. All terms used herein are terms defined in consideration of functions in the present disclosure, and may be different according to intentions or customs of a user or an operator. Accordingly, the terms should be defined based on the description of this specification. The terms used herein are only for describing exemplary embodiments according to the present disclosure and are not to be interpreted as limiting thereto. Unless otherwise defined, the use of the singular form in the present document does not preclude the presence of more than one referent. It should be further understood that the terms "comprises," "comprising," "includes," and/or "including," when used herein, specify the presence of stated features, items, steps, operations, elements, components, or a portion or combination thereof, but do not preclude the presence or addition of one or more other features, items, steps, operations, elements, components, or a portion or combination thereof.

Figure 1:
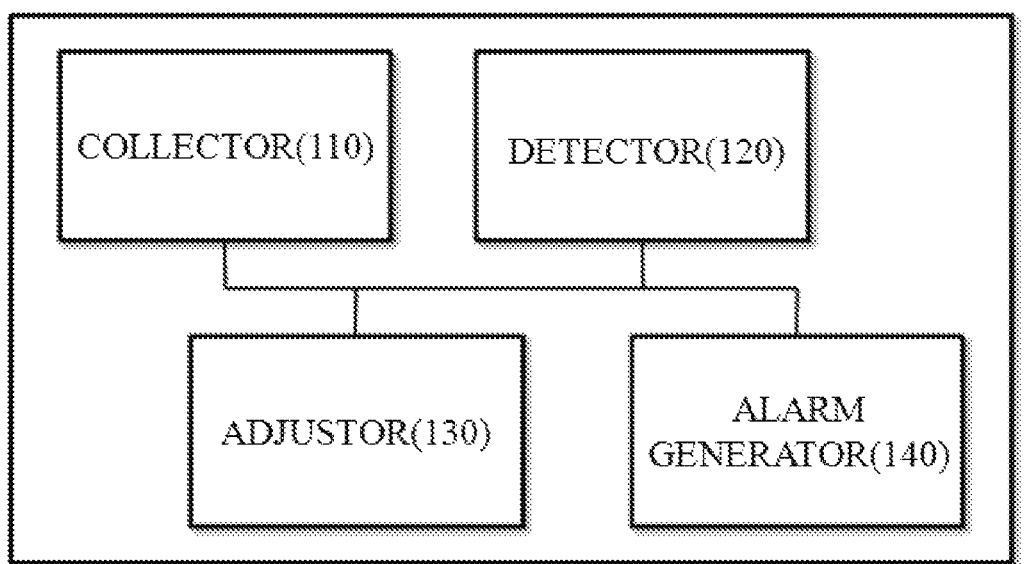
FIG. 1 is a block diagram illustrating a detailed configuration of a computing resource management apparatus according to an embodiment of the present disclosure.

FIG. 1 is a block diagram illustrating a detailed configuration of a computing resource management apparatus 100 according to an embodiment of the present disclosure. As shown in FIG. 1, the computing resource management apparatus 100 according to an embodiment of the present disclosure may include a collector 110, a detector 120, and an adjustor 130, and may further include an alarm generator 140 according to an embodiment.

The computing resource management apparatus 100 according to an embodiment of the present disclosure may manage computing resources needed for performing a virtual network function (VNF). The VNF refers to an implementation of a network function operating based on dedicated hardware to be operated based on a general-purpose server, and for example, refers to functions of a switch, a router, a firewall, a load balancer, etc. being performed in a general-purpose server such as an x86 server. In other words, the VNF used in the present disclosure may be understood as a function which is used by a network common carrier to provide a network service in a network function virtualization (NFV) environment. Accordingly, the VNF may have a form which is separated from the hardware apparatus and performed as well as a form which is combined with a hardware apparatus. In this case, the hardware apparatus may be a physical apparatus which is able to implement the NFV environment, and include a physical server, a virtual machine (VM), a hypervisor, etc.

Computing resources may be a central processing unit (CPU) processing capacity, a memory capacity, a disk capacity, a network bandwidth, etc. provided by a CPU, a memory, a disk input/output (I/O) device, a network device, etc. configuring the hardware apparatus. The computing resources may be configured by each of the CPU processing capacity, the memory capacity, the disk capacity, and the network bandwidth, or a combination thereof.

Meanwhile, in the present disclosure, VNFs may be performed in association with each other. According to an embodiment, the VNFs may be connected each other and operated by service chaining. Service chaining refers to an implementation of one network by considering a customer, a service type, etc. and selectively combining and performing needed VNFs. VNFs connected by (or combined by) service chaining may be operated in association with each other, and for example, a plurality of VNFs may be sequentially operated. In this case, the VNFs connected by service chaining may each use the computing resources in a predetermined ratio. For example, a first VNF to a fourth VNF may be connected by service chaining, and a fifth VNF to an eighth VNF may be separately connected by service chaining. In other words, the VNFs configuring the network service may be combined by service chaining by being divided into one or more groups.

Further, the computing resource management apparatus 100 according to an embodiment of the present disclosure may be included and operated as a portion of a network service provision system, and may be operated by being separated from a network service provision system. Here, the network service provision system may be a system providing a service such as a local area network (LAN), a wide area network (WAN), the Internet, an Intranet, etc.

The collector 110 collects an amount of usage of computing resources used to perform the VNF. The collector 110 may collect the amount of usage of computing resources during a predetermined time (for example, five minutes or ten minutes). The amount of usage of computing resources may be one or more among a real-time usage, a maximum usage, a minimum usage, and an average usage included in information related to an amount of consumed computing resources collected during the predetermined time.

The collector 110 may collect the amount of usage of computing resources of each of the plurality of VNFs. According to an embodiment, the collector 110 may collect an amount of usage of computing resources of VNFs connected by service chaining. For example, the collector 110 may collect information in which 2 GB of the memory capacity is used for performing the first VNF, 4 GB of the memory capacity is used for performing the second VNF, 6 GB of the memory capacity is used for performing the third VNF, and 2 GB of the memory capacity is used for performing the fourth VNF. In this case, the first VNF to the fourth VNF may be connected by service chaining, and the first VNF to the fourth VNF may use the memory capacity, respectively, at a ratio of 1:2:3:1.

The collector 110 may collect the amount of each of the components (for example, the CPU, the memory, the disk I/O device, etc.) configuring the computing resources used for each of the VFNs. For example, the collector 110 may collect information in which the first VNF uses the one core of the CPU processing capacity, 2 GB of the memory capacity, 10 Mbps of the disk I/O performance, etc.

The detector 120 detects a target VNF to be adjusted based on the amount of usage of computing resources collected during the predetermined time (for example, five minutes or ten minutes). The target VNF may refer to a VNF in a case in which an operation of the VFN is delayed due to computing resources used for performing the VNF among the VNFs being lacking or a case in which resource allocated for performing the VNF is not used and wasted.

The detector 120 may detect the target VNF by comparing the amount of usage of computing resources and an amount of allocation of computing resources of each of the VNFs. In detail, the detector 120 may detect a VNF in which a ratio of the amount of usage of computing resources to the amount of allocation of computing resources deviates from a predetermined range as the target VNF. For example, the detector 120 may detect a VNF in which the ratio of the amount of usage of computing resources to the amount of allocation of computing resources is less than or more than a predetermined threshold range (for example, 50% to 80%) as the target VNF.

In an example, when the amount of memory allocated to the VNF is 10 GB and the amount of usage of memory used for performing the VNF is 9 GB, the detector 120 may determine and detect the VNF as the target VNF since the ratio of the amount of usage of memory to the amount or allocated memory corresponding to the VNF is more than the threshold range (for example, 50% to 80%). In another example, when the amount of memory allocated to the VNF is 10 GB and the amount of usage of memory of the VNF is 50 GB, the detector 120 may determine and detect the VNF as the target VNF since the ratio of the amount of usage of memory to the amount of allocation of memory corresponding to the VNF is more than the threshold range (for example, 50% to 80%).

The detector 120 may continuously check the amount of usage of computing resources of each of the VNFs received from the collector 110, and an operation, which will be described hereinafter, may be performed when the target VNF is detected.

The adjustor 130 may adjust the amount of allocation of computing resources of the target VNF. In detail, the adjustor 130 may change the amount of allocation of computing resources in consideration of the amount of usage of computing resources of the target VNF. According to an embodiment, when the target VNF is detected, the adjustor 130 may increase the amount of allocation of computing resources when the ratio of the amount of usage of computing resources to the amount of allocation of computing resources is more than the threshold range, and the adjustor 130 may decrease the amount of allocation of computing resources when the ratio is less than the threshold range.

In one example, when the target VNF in which the amount of memory allocated is 10 GB and the amount of memory used is 9 GB is detected, the adjustor 130 may increase the amount of allocation of memory to 16 GB. In another example, when a VNF in which the amount of memory allocated is 10 GB and the amount of memory of the network apparatus used is 4 GB is detected, the adjustor 130 may decrease the amount of allocation of memory to 8 GB. Accordingly, the ratio of the amount of usage of computing resources to the amount of allocation of computing resources of the VNF may be within the predetermined range (for example, 50% to 80%).

The adjustor 130 may change the amount of allocation of computing resources for a VNF (or VNFs) connected to the target VNF by service chaining. In detail, the adjustor 130 may change the amount of allocation of computing resources for VNF (or VNFs) connected to the target VNF by service chaining so that a ratio between the amount of usage of computing resources corresponding to the target VNF and the amount of usage of computing resources corresponding to the VNF (or VNFs) of connected to the target VNF by service chaining remains constant.

According to an embodiment, the adjustor 130 may adjust the amount of allocation of computing resources of the remaining VNFs connected to the target VNF by service chaining based on the amount of usage of computing resources of each of the VNFs collected by the collector 110. In detail, the adjustor 130 may adjust the amount of allocation of computing resources corresponding to the remaining VNFs so that the ratio between the amount of usage of computing resources corresponding to the target VNF and the amount of usage of computing resources corresponding to the remaining VNFs is the same as a ratio between the adjusted amount of allocation of computing resources of the target VNF and the amount of allocation of computing resources corresponding to the remaining VNFs.

In an example, the memory usage of the first VNF and the second VNF may be 9 GB and 3 GB, respectively. In this case, when the ratio of the amount of usage of computing resources between the first VNF and the second VNF is 3:1 and the adjustor 130 adjusts the amount of allocation of memory corresponding to the first VNF to be 12 GB, the adjustor 130 may adjust the amount of allocation of memory corresponding to the second VNF to be 4 GB. Accordingly, the ratio of the amount of usage of computing resources between the first VNF and the second VNF may be maintained as 3:1.

According to an embodiment, when the amount of allocation of memory of the first VNF and the second VNF is decreased, the saved memory capacity may be allocated to another VNF which does not use service chaining with the first VNF and the second VNF. Accordingly, the adjustor 130 may adjust the amount of allocation of computing resources of service chains.

The operation of allotting and using the memory has been described in the present disclosure, but this is merely for convenience of explanation, and embodiments of the present disclosure may also be applied to any one among the computing resources.

The alarm generator 140 generates an alarm message, and the alarm message indicates that additional computing resources are needed when the amount of the computing resources provided for performing the VNF is lacking. In detail, the alarm generator 140 may generate the alarm message when a changed amount of allocation of computing resources is greater than the amount of the computing resources provided to the VNF by comparing the changed amount of allocation of computing resources and the amount of the computing resources provided to the VNF. In this case, the alarm message may include information related to components (for example, the CPU, the memory, the disk I/O device, etc.) configuring the computing resources which need to be supplemented, and information related to the amount of the computing resources needed.

Figure 2:
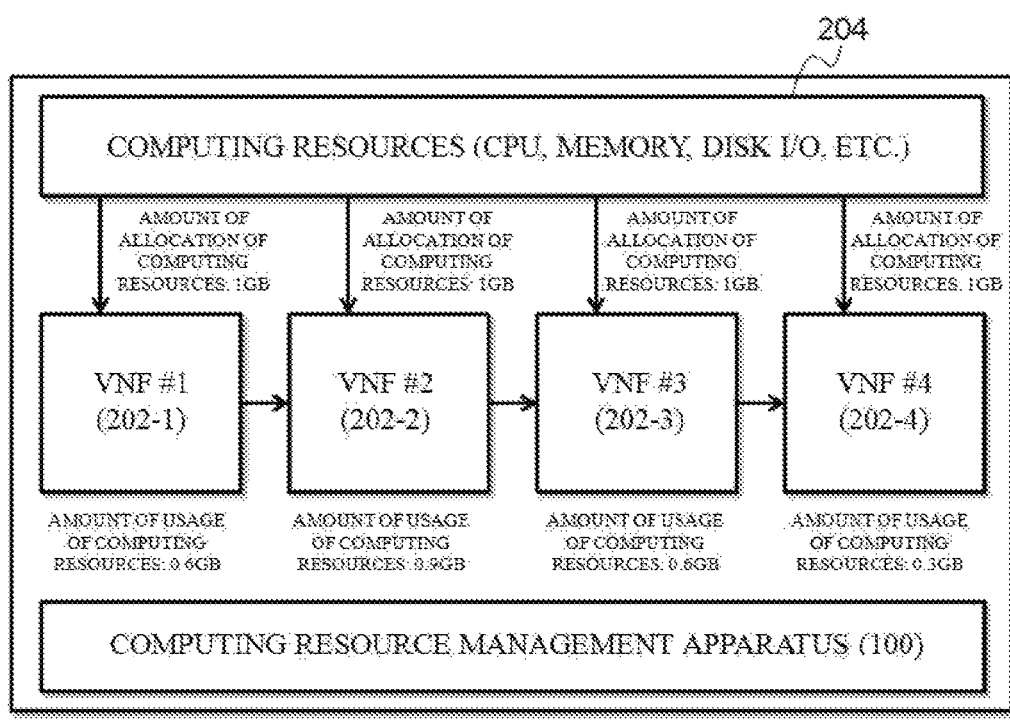
FIG. 2 is a diagram illustrating an operation in which a computing resource management apparatus detects a target virtual network function (VNF) to be adjusted according to an embodiment of the present disclosure.

FIG. 2 is a diagram illustrating an operation in which the computing resource management apparatus 100 detects the target VNF to be adjusted according to an embodiment of the present disclosure.

As shown in FIG. 2, VNFs 202-1, 202-2, 202-3, and 202-4 may be operated by being virtualized so as to be separated from a hardware apparatus. The VNF may refer to an implementation of a network function based on a general-purpose server on behalf of operating based on dedicated hardware, and for example, may refer to functions of a switch, a router, a firewall, a load balancer, etc. being performed in a general-purpose server such as an x86 server. The hardware apparatus may include computing resources 204, and for example, the computing resources 204 may be a CPU processing capacity, a memory capacity, a disk capacity, etc. provided from a CPU, a memory, a disk I/O device, etc.

According to an embodiment, the first VNF 202-1 may be connected to the second VNF 202-2 by service chaining, the second VNF 202-2 may be connected to the third VNF 202-3 by service chaining, and the third VNF 202-3 may be connected to the fourth VNF 202-4 by service chaining.

Meanwhile, each of the VNFs 202 may receive an amount of allocation of computing resources. For example, when it is assumed that the computing resources may be defined as the memory capacity, about 1 GB of the memory capacity may be allocated to each of the VNFs.

The computing resource management apparatus 100 may collect the amount of usage of computing resources used for performing each of the VNFs 202. According to an embodiment, the first VNF 202-1, the second VNF 202-2, the third VNF 202-3, and the fourth VNF 202-4 may respectively use 0.6 GB, 0.9 GB, 0.6 GB, and 0.3 GB of the memory capacity of among the 1 GB of computing resources allocated to each of the VNFs.

Figure 3:
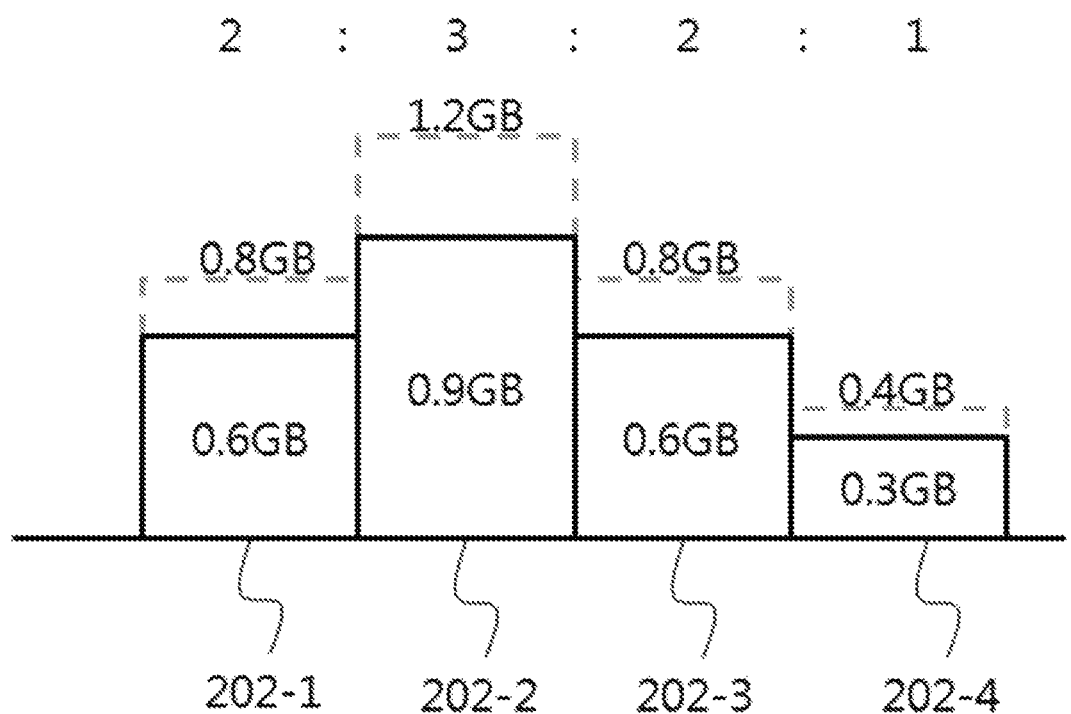
FIG. 3 is a diagram illustrating an operation in which a computing resource management apparatus adjusts an amount of allocation of computing resources according to an embodiment of the present disclosure.

The computing resource management apparatus 100 may detect the target VNF to be adjusted based on the amount of usage of computing resources collected. According to an embodiment, the computing resource management apparatus 100 may detect a VNF in which the ratio of the amount of usage of computing resources to the amount of allocation of computing resources deviates from the predetermined range as the target VNF. For example, the target VNF may be a VNF in which the ratio of the amount of usage of computing resources to the amount of allocation of computing resources is less than or more than the predetermined threshold range (for example, 50% to 80%). Referring to FIG. 3, the second VNF 202-2 may be detected as the target VNF since the ratio of the amount of usage of computing resources to the amount of allocation of computing resources is 90% and is more than the threshold range (50% to 80%). Further, the fourth VNF 202-4 may be detected as the target VNF since the ratio of the amount of usage of computing resources to the amount of allocation of computing resources is 30% and is less than the threshold range (50% to 80%). In other words, the amount of allocation of computing resources may need to be increased for the second VNF 202-2 since an operation of the VNF is delayed. Moreover, the amount of allocation of computing resources may need to be decreased for the fourth VNF 202-4 since the computing resources are wasted.

FIG. 3 is a diagram illustrating an operation in which the computing resource management apparatus 100 adjusts the amount of allocation of computing resources according to an embodiment of the present disclosure. As shown in FIG. 3, the amount of usage of computing resources of the first VNF 202-1, the second VNF 202-2, the third VNF 202-3, and the fourth VNF 202-4 may be 0.6 GB, 0.9 GB, 0.6 GB, and 0.3 GB of the memory capacity, respectively. In the embodiment described above, the first VNF 202-1 to the fourth VNF 202-4 may be connected by service chaining, and the target VNF may be the second VNF 202 and the fourth VNF 202-4.

The computing resource management apparatus 100 may adjust the amount of allocation of computing resources corresponding to the target VNF. According to an embodiment, the computing resource management apparatus 100 may adjust the amount of allocation of computing resources so that the ratio of the amount of usage of computing resources to the amount of allocation of computing resources of each of the second VNF 202-2 and the fourth VNF 202-4 is included in the threshold range (for example, 50% to 80%). In an example, the computing resource management apparatus 100 may adjust the amount of allocation of computing resources of the second VNF 202-2 to be 1.2 GB of the memory capacity. As another embodiment, the computing resource management apparatus 100 may adjust the amount of allocation of computing resources of the fourth VNF 202-4 to be 0.4 GB of the memory capacity.

The computing resource management apparatus 100 may adjust the amount of allocation of computing resources corresponding to the remaining VNFs except the target VNF among the plurality of VNFs configuring a network service, wherein the remaining VNFs is connected to the target VNF by service chaining. In the embodiment described above, the computing resource management apparatus 100 may adjust the amount of allocation of computing resources corresponding to the first VNF 202-1 and the third VNF 202-3. As described above, the first VNF 202-1 and the second VNF 202-2 may be connected by service chaining, and the third VNF 202-3 and the fourth VNF 202-4 may be connected by service chaining. In detail, the computing resource management apparatus 100 may adjust the amount of allocation of computing resources corresponding to the remaining VNFs so that the ratio between the amount of usage of computing resources corresponding to the target VNF and the amount of usage of computing resources of the remaining VNF is the same as that between an adjusted amount of allocation of computing resources of the target VNF and the amount of allocation of computing resources corresponding to the remaining VNF. For example, the ratio of the amount of usage of computing resources among the first VNF 202-1, the second VNF 202-2, the third VNF 202-3, and the fourth VNF 202-4 may be 2:3:3:1. In this case, the amount of allocation of computing resources corresponding to each of the first VNF 202-1 and the third VNF 202-3 may be adjusted to be 0.8 GB of the memory capacity since the amount of allocation of computing resources corresponding to the second VNF 202-2 is adjusted to be 1.2 BG of the memory capacity. Accordingly, after the amount of allocation of computing resources is adjusted, the ratio of the amount of allocation of computing resources among the VNFs may be maintained to be 2:3:2:1.

Figure 4:
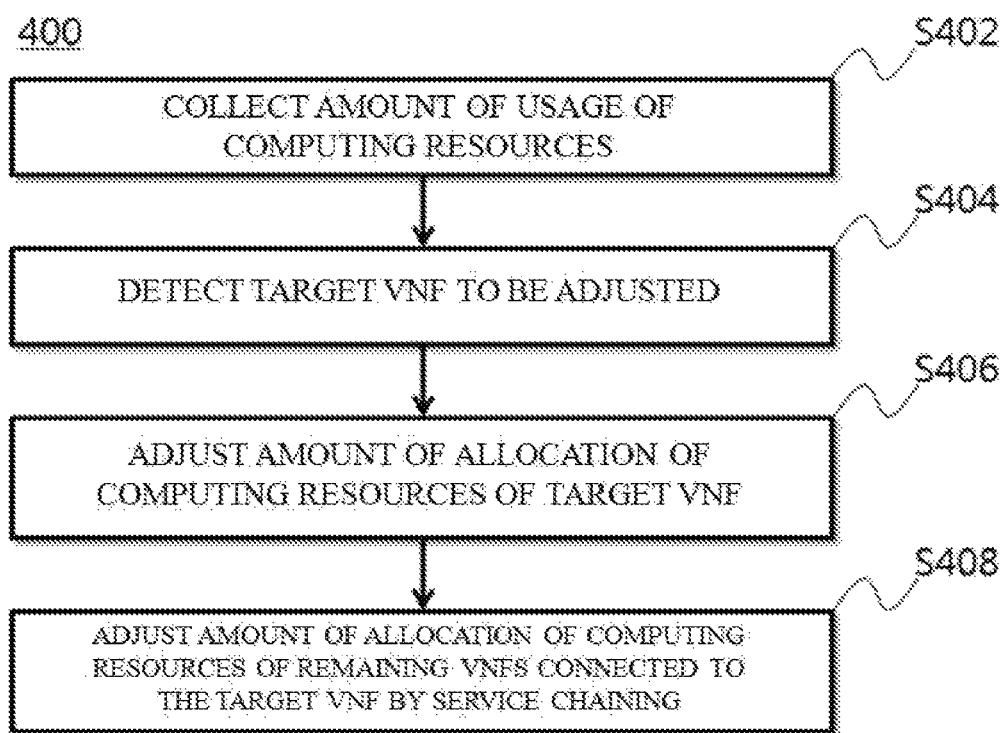
FIG. 4 is a flowchart for describing a computing resource management method according to an embodiment of the present disclosure.

FIG. 4 is a flowchart for describing a computing resource managing method 400 according to an embodiment of the present disclosure. For example, the method shown in FIG. 4 may be performed by the computing resource management apparatus 100. In the flowchart shown, an example in which the method is performed as a plurality of operations is illustrated, but one or more operations may be performed in reverse order, performed together by being combined, omitted or performed by being divided into sub-operations, or one or more operations which are not shown may be additionally performed.

The collector 110 may collect an amount of usage of computing resources of each of a plurality of VNFs (S402).

The detector 120 may detect a target VNF to be adjusted by comparing the collected amount of usage of computing resources and an amount of allocation of computing resources of each of the plurality of VNFs (S404). The detector 120 may detect a VNF in which a ratio of the amount of usage of computing resources to the amount of allocation of computing resources is less than or more than a predetermined threshold range as the target VNF.

The adjustor 130 may adjust the amount of allocation of computing resources corresponding to the target VNF to be increased or decreased (S406). According to an embodiment, the adjustor 130 may increase the amount of allocation of computing resources of the target VNF when target VNF in which the ratio of the amount of usage of computing resources to the amount of allocation of computing resources is more than the threshold range, and decrease the amount of allocation of computing resources of the target VNF when target VNF in which the ratio of the amount of usage of computing resources to the amount of allocation of computing resources is less than the threshold range.

The adjustor 130 may adjust an amount of allocation of computing resources corresponding to the remaining VNFs connected to the target VNF by service chaining (S408). According to an embodiment, the adjustor 130 may adjust the amount of allocation of computing resources based on the ratio between the amount of usage of computing resources corresponding to each of the VNFs connected by service chaining among the collected plurality of VNFs. In detail, the adjustor 130 may adjust the amount of allocation of computing resources corresponding to the remaining VNFs so that the ratio between the amount of usage of computing resources corresponding to the target VNF and the amount of usage of computing resources corresponding to the remaining VNFs is the same as that between the adjusted amount of allocation of computing resources of the target VNF and the amount of allocation of computing resources corresponding to the remaining VNFs.

Meanwhile, the alarm generator 140 may generate an alarm message when the adjusted amount of allocation of computing resources is greater than the amount of the computing resources provided to the VNF by comparing the two amounts. An operation of generating the alarm message may be simultaneously performed with, or be performed after, the operation of adjusting the target VNF and the amount of allocation of computing resources corresponding to the remaining VNFs.

Figure 5:
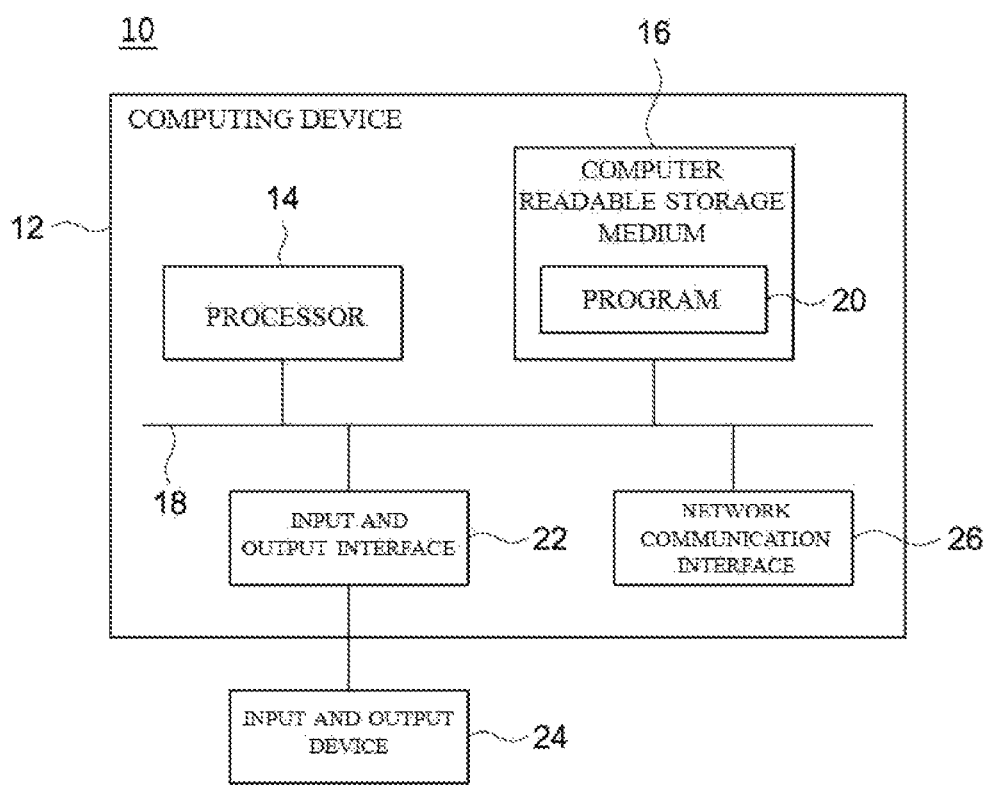
FIG. 5 is a block diagram illustrating an example of a computing environment including a computing system which is suitable for application of exemplary embodiments.

FIG. 5 is a block diagram illustrating an example of a computing environment 10 including a computing system which is suitable for application of exemplary embodiments. In an embodiment shown, each component may have a function and a capability different from those that will be described below, and an additional component may be included besides the components which will be described below.

The computing environment 10 may include a computing device 12. In an embodiment, the computing device 12 may be the computing resource management apparatus 100.

The computing device 12 may include at least one processor 14, a computer readable storage medium 16, and a communication bus 18. The processor 14 may allow the computing device 12 to be operated according to the embodiment described above. For example, the processor 14 may execute one or more programs stored in the computer readable storage medium 16. The one or more programs may include one or more computer executable instructions, and when the computer executable instructions are executed by the processor 14, allow the computing device 12 to perform the operations according to the embodiment.

The computer readable storage medium 16 may be configured to store computer executable instructions and program codes, program data, and/or other suitable forms of information. A program 20 stored in the computer readable storage medium 16 may include a set of instructions executable by the processor 14. In an embodiment, the computer readable storage medium 16 may be a memory (a volatile memory such as a random access memory, a non-volatile memory, or a combination thereof), one or more magnetic disk storage devices, optical disk storage devices, flash memory devices, different kinds of storage media which can be accessed by the computing device 12 and store wanted information, or a combination thereof.

The communication bus 18 may include the processor 14 and the computer readable storage medium 16, and interconnect various components of the computing device 12.

The computing device 12 may include one or more I/O interfaces 22 that provide an interface of one or more I/O devices 24, and one or more network communication interfaces 26. The I/O interface 22 and the network communication interface 26 may be connected to the communication bus 18. The I/O device 24 may be connected to other components of the computing device 12 through the I/O interface 22. The I/O device 24 may include an input device such as a pointing device (a mouse, a track pad, etc.), a keyboard, a touch input device (a touch pad, a touch screen, etc.), a voice or sound input device, various kinds of sensors, and/or a capturing device, and/or an output device such as a display device, a printer, a speaker, and/or a network card. The I/O device 24 may be one component configuring the computing device 12, may be included in the computing device 12, and may be connected to the computing device 12 as a device which is separate from the computing device 12.

According to the embodiments of the present disclosure, a congestion of network traffic may be prevented and wasted computing resources may be minimized due to a lack of computing resources by considering the amount of usage of computing resources of VNF and adjusting the amount of allocation of computing resources of each of the VNFs.

According to the embodiments of the present disclosure, the ratio between the amounts of used computing resources used for performing the plurality of VNFs which are connected by service chaining may be maintained by considering the ratio between the amounts of used computing resources of the plurality of VNFs and additionally adjusting the amount of allocation of computing resources corresponding to the remaining VNFs.

While the embodiments of the present disclosure have been described in detail, it should be apparent to those skilled in the art that various modifications can be made to the above-described embodiments of the present disclosure without departing from the spirit or the scope of the disclosure. Accordingly, it should be understood that the embodiments of the present disclosure are not intended to limit the scope of the disclosure but to describe the disclosure. Therefore, it is intended that the present disclosure covers all such modifications provided they come within the scope of the appended claims and their equivalents.

What is claimed is:

1. A computing resource management apparatus, comprising:
    at least one processor configured to implement:
        a collector configured to collect an amount of computing resources used by each of a plurality of virtual network functions (VNFs) which are connected by service chaining;
        a detector configured to detect, from among the plurality of VNFs, a target VNF to be adjusted by respectively comparing computing resources used by each of the plurality of VNFs with computing resources allocated to each of the plurality of VNFs; and
        an adjustor configured to adjust computing resources allocated to the target VNF, and adjust computing resources allocated to a plurality of remaining VNFs, from among the plurality of VNFs, based on an adjusted amount of computing resources,
    wherein the adjustor is further configured to adjust computing resources allocated to the plurality of remaining VNFs based on a ratio of computing resources used by the target VNF and computing resources used by the plurality of remaining VNFs.

2. The computing resource management apparatus of claim 1, wherein the target VNF has a ratio of computing resources used to computing resources allocated outside a predetermined threshold range.

3. The computing resource management apparatus of claim 2, wherein the adjustor is further configured to increase computing resources allocated to the target VNF when the ratio is greater than the threshold range, and decrease computing resources allocated to the target VNF when the ratio is less than the threshold range.

4. The computing resource management apparatus of claim 1, wherein the adjustor is further configured to adjust computing resources allocated to the plurality of remaining VNFs so that a that the ratio of computing resources used by the target VNF and computing resources used by the plurality of remaining VNFs corresponds to a ratio of computing resources allocated to the target VNF and computing resources allocated to the plurality of remaining VNFs.

5. The computing resource management apparatus of claim 1, wherein the at least one processor is further configured to implement an alarm generator configured to generate an alarm message in response to computing resources allocated to the target VNF being greater than an amount of computing resources provided to the target VNF.

6. A computing resource management method performed by a computing device including one or more processors and a memory configured to store one or more programs executed by the one or more processors, the computing resource management method comprising:
    collecting an amount of computing resources used by each of a plurality of virtual network functions (VNFs) which are connected by service chaining;
    detecting, from among the plurality of VNFs, a target VNF to be adjusted by respectively comparing computing resources used by each of the plurality of VNFs with computing resources allocated to each of the plurality of VNFs;
    adjusting computing resources allocated to the target VNF; and
    adjusting computing resources allocated to a plurality of remaining VNFs, from among the plurality of VNFs, based on an adjusted amount of computing resources,
    wherein the adjusting computing resources allocated to the plurality of remaining VNFs is based on a ratio of computing resources used by the target VNF and computing resources used by the plurality of remaining VNFs.

7. The computing resource management method of claim 6, wherein the target VNF has a ratio of computing resources used to computing resources allocated outside a predetermined threshold range.

8. The computing resource management method of claim 7, wherein the adjusting computing resources allocated to the target VNF comprises increasing computing resources allocated to the target VNF when the ratio is greater than the threshold range, and decreasing computing resources allocated to the target VNF when the ratio is less than the threshold range.

9. The computing resource management method of claim 6, wherein the adjusting computing resources allocated to the plurality of remaining VNFs so that the ratio of computing resources used by the target VNF and computing resources used by the plurality of remaining VNFs corresponds to a ratio of computing resources allocated to the target VNF and computing resources allocated to the plurality of remaining VNFs.

10. The computing resource management method of claim 6, further comprising, generating an alarm message in response to computing resources allocated to the target VNF being greater than an amount of computing resources provided to the target VNF.

11. A non-transitory computer readable recording medium having embodied thereon a program, which when executed by a processor of a computing resource management apparatus causes the computing resource management apparatus to execute a computing resource management method, the computing resource management method including:
  collecting an amount of computing resources used by each of a plurality of virtual network functions (VNFs) which are connected by service chaining;
  detecting, from among the plurality of VNFs, a target VNF to be adjusted by respectively comparing computing resources used by each of the plurality of VNFs with computing resources allocated to each of the plurality of VNFs;
  adjusting computing resources allocated to the target VNF; and
  adjusting computing resources allocated to a plurality of remaining VNFs, from among the plurality of VNFs, based on an adjusted amount of computing resources,
  wherein the adjusting computing resources allocated to the plurality of remaining VNFs is based on a ratio of computing resources used by the target VNF and computing resources used by the plurality of remaining VNFs.

12. The non-transitory computer readable recording medium of claim 11, wherein the target VNF has a ratio of computing resources used to computing resources allocated outside a predetermined threshold range.

13. The non-transitory computer readable recording medium of claim 12, wherein the adjusting computing resources allocated to the target VNF includes increasing computing resources allocated to the target VNF when the ratio is greater than the threshold range, and decreasing computing resources allocated to the target VNF when the ratio is less than the threshold range.

14. The non-transitory computer readable recording medium of claim 11, wherein the adjusting computing resources allocated to the plurality of remaining VNFs so that the ratio of computing resources used by the target VNF and computing resources used by the plurality of remaining VNFs corresponds to a ratio of computing resources allocated to the target VNF and computing resources allocated to the plurality of remaining VNFs.

15. The non-transitory computer readable recording medium of claim 11, wherein the computing resource management method further includes, generating an alarm message in response to computing resources allocated to the target VNF being greater than an amount of computing resources provided to the target VNF.

* * * * *